US008674961B2

(12) United States Patent
Posamentier

(10) Patent No.: US 8,674,961 B2
(45) Date of Patent: Mar. 18, 2014

(54) HAPTIC INTERFACE FOR TOUCH SCREEN IN MOBILE DEVICE OR OTHER DEVICE

(75) Inventor: Joshua Posamentier, Oakland, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 518 days.

(21) Appl. No.: 13/017,282

(22) Filed: Jan. 31, 2011

(65) Prior Publication Data
US 2012/0194466 A1    Aug. 2, 2012

(51) Int. Cl.
*G06F 3/045* (2006.01)
(52) U.S. Cl.
USPC .................. 345/174; 345/173; 178/18.01
(58) Field of Classification Search
USPC .................. 345/173–179; 178/18.01–18.04
See application file for complete search history.

(56) References Cited

U.S. PATENT DOCUMENTS

| | | | |
|---|---|---|---|
| 7,342,573 B2 * | 3/2008 | Ryynanen | 345/173 |
| 7,944,435 B2 * | 5/2011 | Rosenberg et al. | 345/173 |
| 7,952,566 B2 * | 5/2011 | Poupyrev et al. | 345/173 |
| 7,982,720 B2 * | 7/2011 | Rosenberg et al. | 345/173 |
| 8,004,391 B2 * | 8/2011 | Cruz Hernandez | 340/407.1 |
| 8,188,985 B2 * | 5/2012 | Hillis et al. | 345/173 |
| 2008/0303795 A1 * | 12/2008 | Lowles et al. | 345/173 |

OTHER PUBLICATIONS

"Bayfol Reflex", http://www.artificialmuscle.com/technology.php, 2010, 3 pages.
"EPAM Technology", http://www.artificialmuscle.com/technology.php, 2010, 2 pages.
"TouchSense System 2000 Series—Haptics for Mass Market Products", Immersion Corporation, 2010, 6 pages.
"Touchsense Tactile Feedback", Immersion Corporation, 2011, 17 pages.
"Touchsense Force Feedback", Immersion Corporation, 2011, 13 pages.

* cited by examiner

*Primary Examiner* — Kimnhung Nguyen
(74) *Attorney, Agent, or Firm* — Eugene C. Conser; Wade J. Brady, III; Frederick J. Telecky, Jr.

(57) ABSTRACT

A method includes identifying a position of a user's touch on a touch screen, a velocity of the user's touch across the touch screen, and a pressure of the user's touch on the touch screen. The method also includes generating at least one drive signal for driving one or more actuators associated with the touch screen and outputting the at least one drive signal. The at least one drive signal is configured to cause the one or more actuators to generate a desired haptic texture on the touch screen. The at least one drive signal is based on the position, the velocity, and the pressure. For example, a waveform of the at least one drive signal could be based on the position. Also, groups of pulses in the at least one drive signal could have a frequency and waveform based on the velocity or an amplitude based on the pressure.

6 Claims, 5 Drawing Sheets

HAPTIC INTERFACE FOR TOUCH SCREEN IN MOBILE DEVICE OR OTHER DEVICE

TECHNICAL FIELD

This disclosure is generally directed to touch screen user interfaces. More specifically, this disclosure is directed to a haptic interface for a touch screen in a mobile device or other device.

BACKGROUND

Many modern electronic devices include a touch-sensitive screen (referred to as a "touch screen"), which represents a graphical display that also receives input through contact with a user's finger, a stylus, or other input mechanism. More advanced touch screens often support haptic feedback, where a user feels feedback from a touch screen when the user contacts the touch screen. Haptic feedback could, for example, cause a user to feel vibrations when the user invokes a particular feature of an electronic device. This can be particularly useful in vehicle navigation systems or other systems in which feedback is provided without requiring a user to look at a touch screen.

BRIEF DESCRIPTION OF DRAWINGS

For a more complete understanding of this disclosure and its features, reference is now made to the following description, taken in conjunction with the accompanying drawings, in which.

DETAILED DESCRIPTION

FIG. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
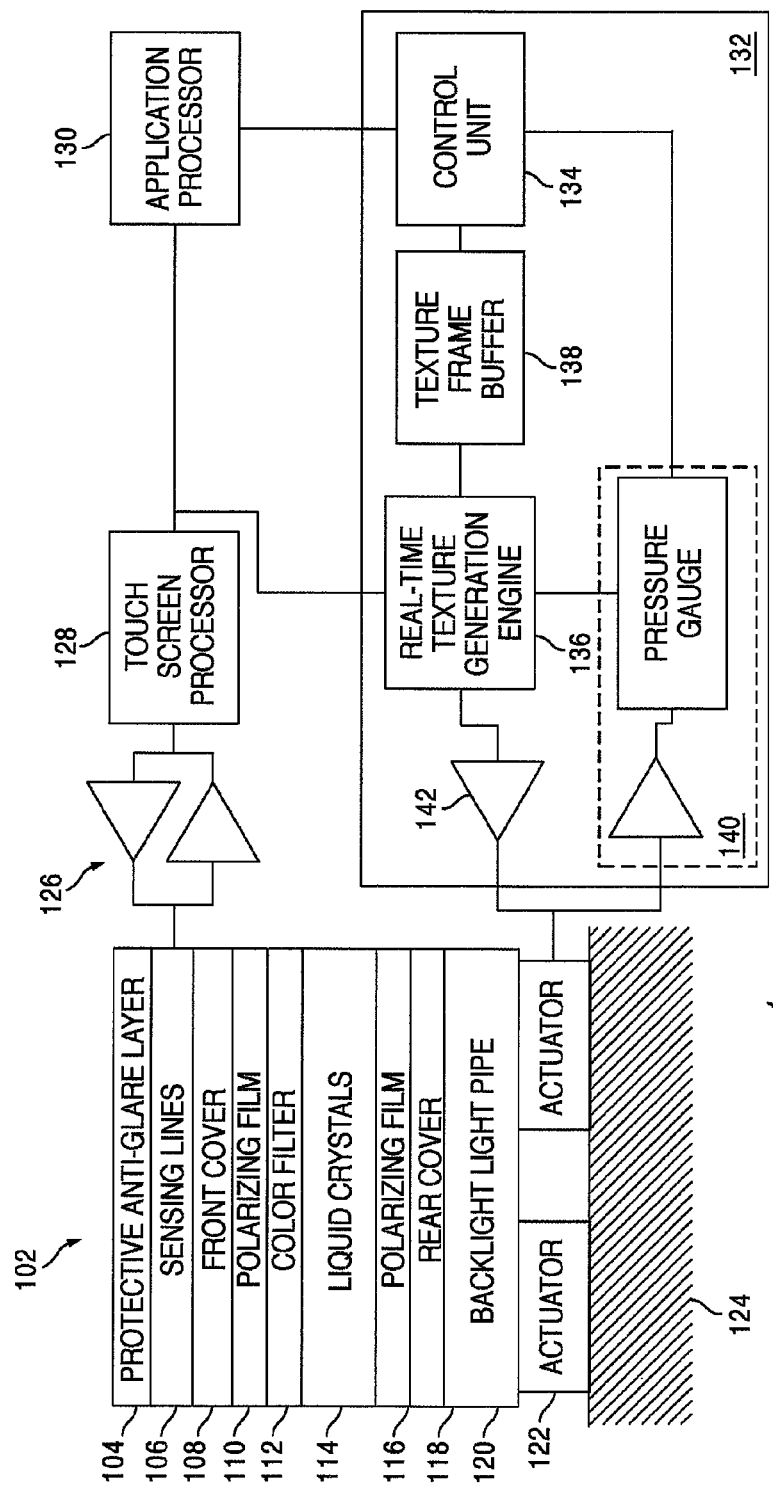
FIG. 1 illustrates an example system supporting a haptic interface for a touch screen in accordance with this disclosure.

FIG. 1 illustrates an example system 100 supporting a haptic interface for a touch screen in accordance with this disclosure. As shown in FIG. 1, the system 100 includes a touch screen 102. The touch screen 102 generally represents a graphical display that receives input through contact with one or more external objects. The external objects could include a user's finger(s), a stylus, or any other suitable object(s). The touch screen 102 could use any suitable technology to detect contact with an external object. Example touch screens 102 include resistive touch screens, capacitive touch screens, surface acoustic wave (SAW) touch screens, infrared touch screens, and optical touch screens.

In this example, the touch screen 102 includes a touch interface that is formed by a protective anti-glare layer 104 and sensing lines 106. The anti-glare layer 104 helps to reduce glare on the touch screen 102 while protecting the underlying structures. The sensing lines 106 are used to help identify one or more locations where the touch screen 102 is contacted by a user. The sensing lines 106 could, for example, include capacitive or resistive lines depending on the type of touch screen being used.

The touch screen 102 also includes a display formed by a front cover 108, a polarizing film 110, an optional color filter 112, liquid crystals 114, a polarizing film 116, a rear cover 118, and a backlight light pipe 120. The front cover 108 and the rear cover 118 provide support for and encase other structures of the display and can be formed from any suitable material(s), such as glass. The polarizing films 110 and 116 polarize light passing through the touch screen 102, and often the films 110 and 116 have perpendicular transmission axes. The color filter 112 can filter particular colors from light passing through the touch screen 102. The color filter 112 may be omitted, however, such as when the touch screen 102 supports field sequential color (FSC). The liquid crystals 114 represent molecules that can be realigned to control the passage of light between the polarizing films 110 and 116. The backlight light pipe 120 provides light from an external source (such as one or more light emitting diodes) to the touch screen 102.

Each of the structures in the touch screen 102 could be formed from any suitable material(s) and in any suitable manner. Also, each of the structures in the touch screen 102 could have any suitable size, shape, and dimensions. Note that the structures in the touch screen 102 shown in FIG. 1 are not drawn to scale.

The touch screen 102 includes or is mounted on multiple actuators 122, which are mounted on a mechanical connection 124. The actuators 122 represent structures that can vibrate, bend, sheer, or otherwise create movement that can be perceived by a user through the touch screen 102. Because of this, the actuators 122 are used to provide haptic feedback to the user through the touch screen 102. Each of the actuators 122 includes any suitable structure for creating movement of at least a portion of a touch screen. Each of the actuators 122 could, for example, include a strip of ceramic or other piezoelectric material(s). Also, any suitable arrangement of actuators 122 could be used. The connection 124 includes any suitable mechanism for mechanically connecting the actuators 122 to a case, printed circuit board, or other structure. Note, however, that the actuators 122 could be mounted directly on a case, printed circuit board, or other structure in a mobile telephone or other device.

In this example, the sensing lines 106 of the touch interface are coupled via drivers 126 to a touch screen processor 128. The touch screen processor 128 analyzes signals from the touch interface to identify any location(s) where the touch screen 102 is being touched. Depending on the implementation, the touch screen processor 128 could use changes in capacitance, resistance, or other technique to identify the location(s) where the touch screen 102 is being touched. The touch screen processor 128 can also optionally identify the velocity at which an object is being moved or "swept" across the touch screen 102. For instance, the touch screen processor 128 could determine the speed and direction at which a user is moving his or her finger across the touch screen 102.

The touch screen processor 128 includes any suitable structure for identifying information related to how a touch screen is being contacted. The touch screen processor 128 could, for instance, include a microprocessor, microcontroller, digital signal processor, field programmable gate array, or application specific integrated circuit. In some embodiments, the touch screen processor 128 executes software or firmware instructions to provide the desired functionality. Each of the drivers 126 includes any suitable structure for driving signals to an intended destination.

The touch screen processor 128 can output an identified location and optionally the velocity of one or more touches on the touch screen 102 to an application processor 130. The application processor 130 can execute one or more applications to provide any desired functionality. For example, the application processor 130 could use the identified locations or velocities output by the touch screen processor 128 to initiate or accept telephone calls, send or view instant messages, allow a user to surf the Internet or play games, or any other of a wide variety of functions. The application processor 130 includes any suitable structure for executing one or more applications. The application processor 130 could, for instance, include a microprocessor, microcontroller, digital signal processor, field programmable gate array, or application specific integrated circuit.

In this example, the system 100 includes a haptics subsystem 132 that supports the use of haptic feedback with the touch screen 102. The haptics subsystem 132 here includes a control unit 134, which generally controls the operation of the haptics subsystem 132. For example, the control unit 134 could enable and disable the use of haptics, provide feedback data (such as touch pressure data) to the application processor 130, or perform any other necessary or desired operations. The control unit 134 includes any suitable structure for controlling the haptics subsystem 132, such as a state machine.

Actual haptic feedback through the touch screen 102 is created using a real-time texture generation engine 136 and a texture frame buffer 138. The texture frame buffer 138 stores data defining one or more textures to be created on the touch screen 102, such as by defining waveforms to be used to create different textures. The texture generation engine 136 controls the actuators 122 to produce one or more of these textures in closed-loop fashion using location, velocity (such as speed and direction), and pressure as inputs. For example, as described below, different areas of the touch screen 102 could be associated with different textures. As a particular example, different buttons could have different textures, such as one button with a grid of coarse dots and another button with ridges. The texture generation engine 136 can use the location and velocity of a user's touch to generate the appropriate haptic feedback using the actuators 122. In embodiments where the touch screen processor 128 does not calculate the velocity of a user's touch on the touch screen 102, the texture generation engine 136 can also calculate the velocity based on output from the touch screen 102.

The texture felt by the user and induced by the actuators 122 is synthesized by simulating the motion of the signal coming from the touch screen processor 128 over the virtual texture stored in the frame buffer 138. This feedback operation is performed with low latency to provide realistic haptic feedback.

The texture generation engine 136 includes any suitable structure for generating signals for creating haptic feedback in a touch screen. For example, the texture generation engine 136 could include a microprocessor, microcontroller, digital signal processor, field programmable gate array, or application specific integrated circuit. In some embodiments, the texture generation engine 136 executes software or firmware instructions to provide the desired functionality. The frame buffer 138 includes any suitable storage structure for storing and facilitating retrieval of data defining one or more textures.

A pressure gauge and amplifier 140 measures the touch force or pressure applied to the touch screen 102 by the object(s) contacting the touch screen 102. In some embodiments, the touch pressure is measured using the actuators 122. For example, when the actuators 122 are formed from piezo-electric material, touch pressure from an object contacting the touch screen 102 can create an electrical charge in the piezo-electric material. This can be measured by the gauge and amplifier 140 to estimate the amount of pressure being applied to the piezo-electric material. The pressure gauge and amplifier 140 can then provide the measured pressure to the control unit 134 or the texture generation engine 136, which could use the measured pressure to modify the haptic feedback being created. The pressure gauge and amplifier 140 includes any suitable structure for measuring touch pressure on a touch screen, such as a strain gauge.

The texture generation engine 136 and the pressure gauge and amplifier 140 are coupled to the actuators 122 via a driver 142. The driver 142 includes any suitable structure for driving signals to an intended destination.

Although not shown, the haptics subsystem 132 may include an analog cancellation path to reduce or prevent the drive waveform for the driver 142 from reaching the pressure gauge and amplifier 140. This allows simultaneous full duplex operation of both haptic actuation and pressure sensing.

In one aspect of operation, a user can touch the touch screen 102 at a specific location and sweep across the touch screen 102, meaning the user moves his or her finger or other object across the touch screen 102. The touch screen processor 128 can identify the specific location currently being touched by the user, and the touch screen processor 128 or texture generation engine 136 can calculate the velocity of the user's sweep. The texture generation engine 136 can use a texture associated with the location and the velocity to generate haptic feedback. As a specific example, if the user touches a portion of the touch screen 102 associated with a ridged texture, a slower sweep could result in fewer ridges being felt by the user, meaning a lower frequency of ridges are sensed by the user. A faster sweep could result in more ridges being felt by the user, meaning a higher frequency of ridges are sensed by the user. Note that the waveform used to drive the actuators 122 can vary depending on the velocity in order to provide the desired haptic texture. Moreover, the pressure of the user's touch can be measured by the pressure gauge and amplifier 140, and the texture generation engine 136 can use the measured pressure to modify the haptic feedback being generated. For instance, a touch at higher pressure may require less force from the actuators 122 in order for the haptic feedback to be noticed by the user, while a touch at lower pressure may require greater force in order for the haptic feedback to be noticed. In some embodiments, pulses in drive signals for the actuators 122 have variable amplitudes, and the amplitudes are based on the measured pressures.

Note that in some embodiments, the texture generation engine 136 may drive all or substantially all of the actuators 122 to provide the desired texture on the touch screen 102. However, the user only perceives that texture at the current location(s) contacted by the user. When the user's contact with the touch screen 102 changes location, the actuators 122 can be used to create a different texture. As a result, even though each texture could conceivably be produced over a large portion (or even the entire surface) of the touch screen 102, the user would only sense each texture at the specific location(s) on the touch screen 102 associated with each texture. In other words, the texture generation engine 136 need not be designed to isolate a particular texture to a specific portion of the touch screen 102. In other embodiments, the texture generation engine 136 can isolate a particular texture to a specific portion of the touch screen 102, such as by driving a selected subset of the actuators 122.

In this way, the system 100 uses closed-loop control of touch location, touch velocity, and touch pressure to control haptic feedback. Among other things, this can help to reduce errors, such as by reducing the likelihood that a user selects an incorrect button or other item displayed on the touch screen 102. Moreover, this can increase the usability of the touch screen 102 in low-visual situations, meaning situations in which a user may not be able to fully concentrate on the touch screen 102 (such as when the user is driving). In addition, this closed-loop control can be used regardless of the type of touch screen technology.

Although FIG. 1 illustrates one example of a system 100 supporting a haptic interface for a touch screen, various changes may be made to FIG. 1. For example, as noted above, any suitable touch screen 102 could be used. Also, the functional division shown in FIG. 1 is for illustration only. Various components in FIG. 1 could be rearranged, omitted, combined, or further subdivided and additional components could be added according to particular needs. As a specific example, the touch screen processor 128 and the application processor 130 could be combined into a single processing unit. As another specific example, the components of the haptics subsystem 132 could be implemented using a single integrated circuit chip or other device.

Figure 2A:
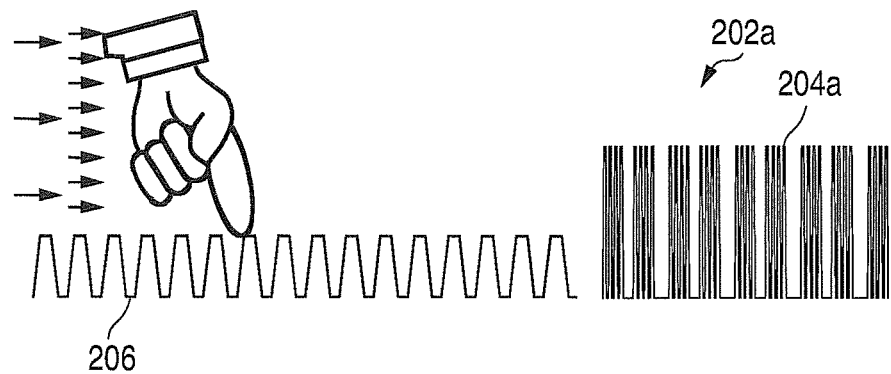
FIGS. 2A and 2B illustrate example waveforms in a haptic interface for a touch screen in accordance with this disclosure.
Figure 2B:
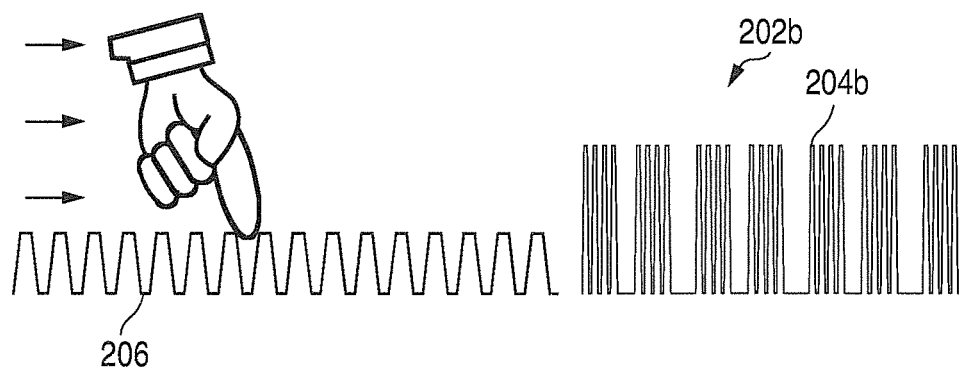

FIGS. 2A and 2B illustrate example waveforms in a haptic interface for a touch screen in accordance with this disclosure. In particular, FIGS. 2A and 2B illustrate example actuator drive waveforms 202a-202b that could be provided to the actuators 122 in the system 100 by the texture generation engine 136.

In FIGS. 2A and 2B, a user is swiping his or her finger across the touch screen 102. In each case, the actuators 122 are driven using groups of pulses 204a-204b in the waveforms 202a-202b, respectively. Each pulse in the pulse groups 204a-204b activates at least one of the actuators 122, while the actuators 122 are deactivated between pulses. This creates the sensation that the user's finger is passing over a ridged or bumpy surface 206.

In FIG. 2A, the user's finger is moving more rapidly, so the pulse groups 204a have a shorter duration and are closer together. This creates the sensation that would be expected if the user was quickly moving his or her finger over actual ridges or bumps. In FIG. 2B, the user's finger is moving more slowly, so the pulse groups 204b have a longer duration and are farther apart. Again, this creates the sensation that would be expected if the user was slowly moving his or her finger over actual ridges or bumps. Note that the waveforms themselves can also be based on the velocity of the user's swipe across the touch screen 102. Faster swipes may require the use of a different waveform than slower swipes in order to create the appropriate texture.

The user's sweeps here are constant pressure, meaning that the user maintains a constant touch pressure against the touch screen 102 during movement of his or her finger over the touch screen 102. This can be seen in FIGS. 2A and 2B since the amplitudes of the pulse groups 204a-204b are constant during the user's sweeps. If the pressure gauge and amplifier 140 detects a change in touch pressure during a sweep, the texture generation engine 136 could modify the waveforms 202a-202b by increasing or decreasing the amplitudes of the pulses in the pulse groups 204a-204b. Also note that while the waveforms 202a-202b are separate in these figures, a single actuator drive waveform could have both faster and slower pulse groups 204a-204b if the user's sweep lacks a constant speed.

Although FIGS. 2A and 2B illustrate examples of waveforms 202a-202b in a haptic interface for a touch screen, various changes may be made to FIGS. 2A and 2B. For example, any suitable simulated surface could be created using the waveforms. Also, any suitable waveforms can be generated for driving the actuators 122 in order to create the desired textures on the touch screen 102.

Figure 3:
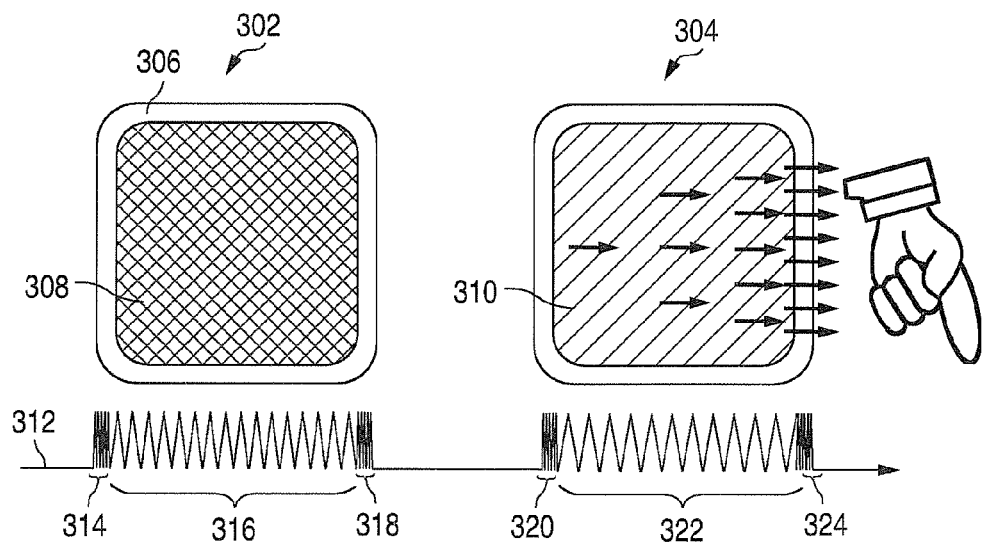
FIG. 3 illustrates an example of haptic feedback for a touch screen in accordance with this disclosure.

FIG. 3 illustrates an example of haptic feedback for a touch screen in accordance with this disclosure. In particular, FIG. 3 illustrates one specific way in which haptic feedback can be used in the system 100. In this example, the system 100 is being used to display two buttons 302-304 to a user, and the user is sweeping his or her finger across one or more of the buttons 302-304.

As shown in FIG. 3, each button 302-304 includes a border 306 having a texture of tight bumps. An interior 308 of the button 302 has a coarse grid of dots as a texture, while an interior 310 of the button 304 has a texture of tight ridges. As explained above, different regions of the touch screen 102 can have different textures stored in the frame buffer 138.

When the system 100 detects that the user is sweeping across particular regions of the touch screen 102, the texture generation engine 136 retrieves the appropriate textures and generates waveforms 312 for the actuators 122. The waveforms 312 here include different portions 314-324 that create different textures on the touch screen 102. For example, the portions 314, 318, 320, and 324 are used to generate the sensation of tight bumps on the touch screen 102. The portion 316 is used to generate the sensation of a coarse grid of dots on the touch screen 102, and the portion 322 is used to generate the sensation of tight ridges on the touch screen 102.

If the actuators 122 denote piezo-electric strips or other strips of material disposed horizontally across the touch screen 102, the actuators 122 could be repeatedly activated for very short periods of time in order to generate the sensation of tight bumps on the touch screen 102. The activation of different actuators 122 could be synchronized or unsynchronized. In order to provide the sensation of a coarse grid of dots on the touch screen 102, multiple groups of adjacent actuators 122 could be repeatedly activated and deactivated at the same time, while other actuators 122 between the groups are not activated. In order to provide the sensation of tight ridges on the touch screen 102, different actuators 122 could be repeatedly activated and deactivated at different times.

Once again, the sweep shown in FIG. 3 is assumed to be at a constant touch pressure, so the amplitudes of the pulses in the waveforms 312 are equal. If the touch pressure varies during a sweep, this can be detected by the pressure gauge and amplifier 140, and the texture generation engine 136 can alter the amplitudes of the pulses in the waveforms 312 accordingly.

Effectively, the texture generation engine 136 is "playing back" the appropriate texture from the frame buffer 138 based on the real-time output of the touch screen processor 128. Moreover, the texture generation engine 136 is modifying the amplitude of the texture based on the real-time output of the pressure gauge and amplifier 140.

Although FIG. 3 illustrates one example of haptic feedback for a touch screen, various changes may be made to FIG. 3. For example, buttons or other user input mechanisms displayed on a touch screen 102 could have any other suitable associated texture(s).

Figure 4A:
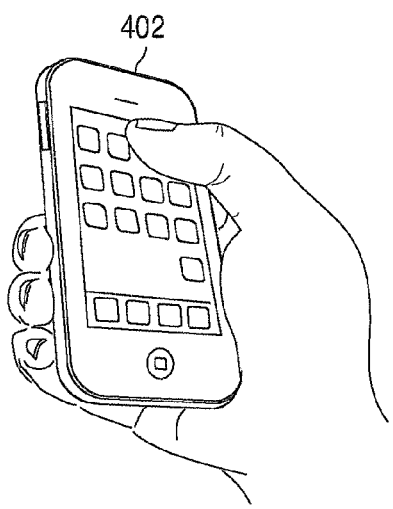
FIGS. 4A through 4F illustrate example devices incorporating a haptic interface for a touch screen in accordance with this disclosure.
Figure 4B:
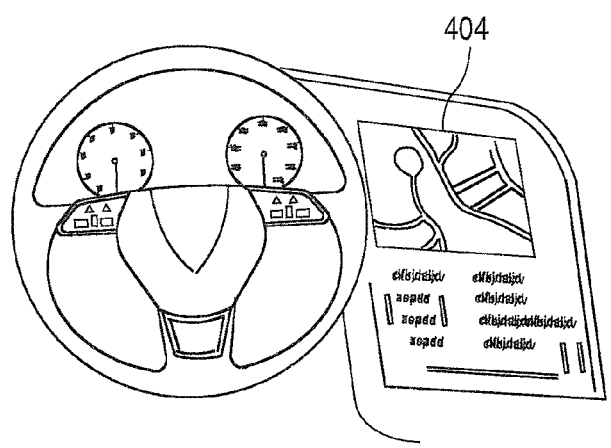
Figure 4C:
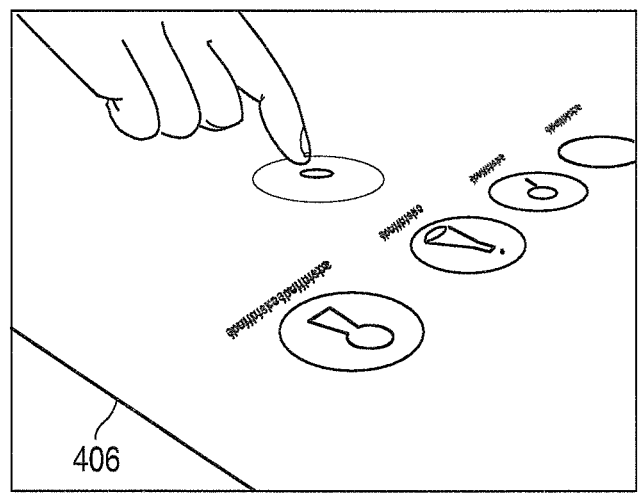
Figure 4D:
Figure 4E:
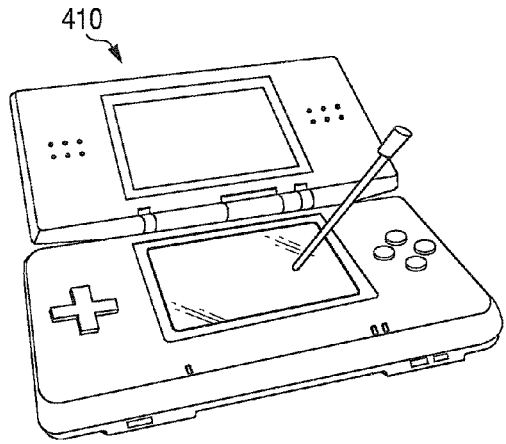
Figure 4F:
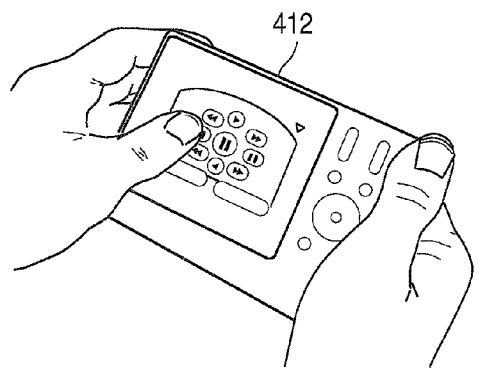

FIGS. 4A through 4F illustrate example devices incorporating a haptic interface for a touch screen in accordance with this disclosure. In general, the system 100 shown in FIG. 1 (or any suitable modified version thereof) could be used in any suitable device or system to support user interaction. For example, the system 100 could be used in a handheld user device 402 as shown in FIG. 4A. In this example, the user device 402 represents an APPLE IPHONE, although any other mobile telephone, personal digital assistant, or mobile device could incorporate the system 100. The system 100 could also be used in a vehicle navigation system 404 as shown in FIG. 4B. Other example uses include a surface computing device 406 as shown in FIG. 4C (such as a table having a touch screen as a top surface) or a tablet device 408 as shown in FIG. 4D (such as an e-book reader or tablet computer like the AMAZON KINDLE or an APPLE IPAD). In addition, the system 100 could be used in a portable gaming device 410 as shown in FIG. 4E (such as a NINTENDO DS or SONY PSP) or a portable media player, touch screen remote control, or other consumer electronic device 412 as shown in FIG. 4F.

Although FIGS. 4A through 4F illustrate examples of devices incorporating a haptic interface for a touch screen, various changes may be made to FIGS. 4A through 4F. For example, these merely represent examples of the types of devices in which touch screens with haptic feedback can be used. The system 100 could be used with any other suitable fixed or portable device.

Figure 5:
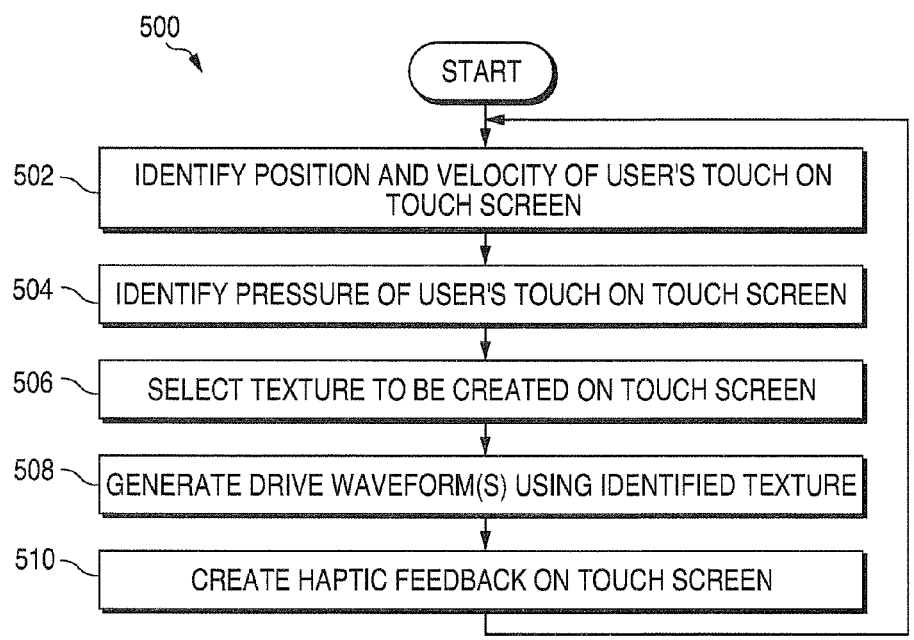
FIG. 5 illustrates an example method for providing haptic textures for a touch screen in accordance with this disclosure.

FIG. 5 illustrates an example method 500 for providing haptic textures for a touch screen in accordance with this disclosure. As shown in FIG. 5, a position and a velocity of a user's touch on a touch screen are identified at step 502. This could include, for example, the haptics subsystem 132 receiving an identification of the location of the user's touch on the touch screen 102 from the touch screen processor 128. This could also include the haptics subsystem 132 receiving an identification of the velocity of the user's sweep across the touch screen 102 from the touch screen processor 128 or the haptics subsystem 132 calculating the velocity of the user's sweep based on output from the touch screen processor 128.

A pressure of the user's touch on the touch screen is identified at step 504. This could include, for example, the pressure gauge and amplifier 140 measuring the pressure of the user's touch on the touch screen 102 using the actuators 122. As a particular example, this could include the pressure gauge and amplifier 140 using a charge on a piezo-electric material to measure the strain placed on the piezo-electric material.

A texture to be created on the touch screen is selected at step 506. This could include, for example, the texture generation engine 136 retrieving a texture from the frame buffer 138. The retrieved texture could be selected based on the identified location of the user's touch on the touch screen 102.

At least one drive waveform is generated using the identified texture at step 508, and haptic feedback is created on the touch screen at step 510. This could include, for example, the texture generation engine 136 generating drive waveforms for the actuators 122. The drive waveforms contain pulses that activate and deactivate the actuators 122 in order to generate the desired texture. The amplitudes of the pulses in the drive waveforms can also be varied based on the measured pressure of the user's touch on the touch screen 102.

Although FIG. 5 illustrates one example of a method 500 for providing haptic textures for a touch screen, various changes may be made to FIG. 5. For example, while shown as a series of steps, various steps in FIG. 5 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a touch screen comprising multiple electrodes, wherein the electrodes receive input through contact with one or more external objects and provides location of the contact on the electrodes;
one or more actuators mechanically connected to a mechanical connection, wherein the actuators provide movement that can be perceived by a user through the touch screen;
an application processor configured to provide desired functionality to one of: a handheld communication device, a vehicle navigation system, a surface computing device, a tablet device, a handheld gaming device, and a handheld media player;
a texture generation engine configured to:
identify a position of a user's touch on a touch screen, a velocity of the user's touch across the touch screen, and a pressure of the user's touch on the touch screen; and
generate at least one drive signal for driving one or more of the actuators associated with the touch screen, the at least one drive signal configured to cause the one or more actuators to generate a desired haptic texture to reflect the user's position on the touch screen, the pressure of the user's touch on the touch screen and the velocity of the user's touch as it moves across the touch screen;
wherein the texture generation engine is configured to generate the at least one drive signal by selecting and synthesizing a waveform associated with the desired haptic texture based on the position of the user's touch on the touch screen;

wherein the texture generation engine is configured to generate the at least one drive signal by generating groups of pulses in the at least one drive signal, wherein each group of pulses is separated by a dead zone, wherein the duration of the dead zone is directly proportional to the velocity of the users finger moving over the screen, wherein a shorter duration of the dead zone corresponds to higher velocity of movement and a longer duration of the dead zone corresponds to lower velocity of movement, thus creating the sensation that would be expected if the user was quickly moving his or her finger over actual ridges or bumps;

the groups of pulses have an amplitude based on the pressure of the user's touch on the touch screen;

a pressure gauge configured to measure the pressure of the user's touch on the touch screen using the one or more actuators and to provide the identified pressure to the texture generation engine;

a first driver configured to couple the one or more actuators and an output of the texture generation engine;

a second driver configured to couple the one or more actuators and an input of the pressure gauge;

a storage unit configured to store information defining the waveform, wherein the texture generation engine is configured to retrieve the stored information; and a control unit configured to enable and disable the use of haptics, and provide feedback data to the application processor;

a touch screen processor configured to identify the position of the user's touch, the touch screen processor also configured to provide the identified position to the texture generation engine, and the application processor.

2. The apparatus of claim 1, wherein the touch screen comprises one of: a capacitive touch screen, a resistive touch screen, a surface acoustic wave (SAW) touch screen, an infrared touch screen, and an optical touch screen.

3. The apparatus of claim 1, wherein the apparatus containing the texture generation engine comprises a portion of one of: a handheld communication device, a vehicle navigation system, a surface computing device, a tablet device, a handheld gaming device, and a handheld media player.

4. A method comprising:

identifying a position of a user's touch on a touch screen, a velocity of the user's touch across the touch screen, and a pressure of the user's touch on the touch screen;

generating at least one drive signal for driving one or more actuators associated with the touch screen; and outputting the at least one drive signal, the at least one drive signal configured to cause the one or more actuators to generate a desired haptic texture to reflect the user's position on the touch screen, the pressure of the user's touch on the touch screen and the velocity of the user's touch as it moves across the touch screen;

configuring a texture generation engine to generate the at least one drive signal by selecting and synthesizing a waveform associated with the desired haptic texture based on the position of the user's touch on the touch screen;

configuring the texture generation engine to generate the at least one drive signal by generating groups of pulses in the at least one drive signal, wherein each group of pulses is separated by a dead zone, wherein the duration of the dead zone is directly proportional to the velocity of the users finger moving over the screen, wherein a shorter duration of the dead zone corresponds to higher velocity of movement and longer duration of the dead zone corresponds to lower velocity of movement, thus creating the sensation that would be expected if the user was quickly moving his or her finger over actual ridges or bumps;

measuring the pressure of the user's touch on the touch screen using the one or more actuators;

providing an amplitude to the groups of pulses based on the pressure of the user's touch on the touch screen.

5. The method of claim 4, wherein identifying the position of the user's touch on the touch screen comprises receiving the position from a touch screen processor.

6. The method of claim 4, wherein the desired haptic texture comprises at least one of:

a first specified texture forming a border around each of first and second buttons displayed on the touch screen;

a second specified texture within the border of the first button;

a third specified texture within the border of the second button; and a fourth specified texture between the first and second buttons reflecting the velocity of the users touch as it moves between the two buttons.

* * * * *